(12) United States Patent
Arndt et al.

(10) Patent No.: US 6,276,521 B1
(45) Date of Patent: Aug. 21, 2001

(54) MODULAR TRUSS ASSEMBLY FOR A CONVEYOR SYSTEM

(75) Inventors: Bruce Arndt, Algonquin; A. Steven Ledger, Addison; Robert F. Oury, Gilberts, all of IL (US)

(73) Assignee: Rotec Industries Inc., Elmhurst, IL (US)

( * ) Notice: Subject to any disclaimer, the term of this patent is extended or adjusted under 35 U.S.C. 154(b) by 0 days.

(21) Appl. No.: 09/464,940

(22) Filed: Dec. 16, 1999

Related U.S. Application Data
(60) Provisional application No. 60/112,355, filed on Dec. 16, 1998.

(51) Int. Cl.[7] .................................................. B65G 21/00
(52) U.S. Cl. ...................................... 198/860.2; 198/860.1
(58) Field of Search .............................. 198/860.1, 860.2, 198/818, 830

(56) References Cited

U.S. PATENT DOCUMENTS

| | | | | |
|---|---|---|---|---|
| 2,793,738 | * | 5/1957 | Erickson ............................ | 198/860.1 |
| 4,467,914 | * | 8/1984 | Trammel et al. .................. | 198/860.2 |
| 5,108,153 | * | 4/1992 | Pennington et al. ........... | 198/860.2 X |
| 5,370,218 | * | 12/1994 | Johnson, Jr. et al. ............ | 198/860.1 |
| 5,645,158 | * | 7/1997 | Polka et al. ..................... | 198/860.2 X |
| 5,762,179 | | 6/1998 | Oury et al. ........................ | 198/861.1 |
| 5,797,481 | | 8/1998 | Uber et al. ........................... | 198/813 |

* cited by examiner

Primary Examiner—James R. Bidwell
(74) Attorney, Agent, or Firm—McAndrews, Held & Malloy, Ltd.

(57) ABSTRACT

A conveyor truss module for constructing conveyor support spans includes a substantially rectangular base assembly and a single-pin top chord joint. The conveyor truss module also includes a plurality of lacing struts coupled to the single-pin top chord joint and the corners of the base assembly.

26 Claims, 9 Drawing Sheets

MODULAR TRUSS ASSEMBLY FOR A CONVEYOR SYSTEM

CROSS-REFERENCE TO RELATED APPLICATION

This application is related to and claims priority benefits from U.S. Provisional Patent Application Ser. No. 60/112, 355 filed Dec. 16, 1998, entitled "Hazardous Waste Pond Conveyor System". The '355 provisional application is incorporated herein by reference in its entirety.

FIELD OF THE INVENTION

The present invention relates generally to conveyor support structures. More specifically, the present invention relates to truss modules for use in constructing conveyor support spans.

BACKGROUND OF THE INVENTION

In many conveyor applications, a conveyor must transport material over an area in which providing support from directly below or above the conveyor is impractical. Conveyor support bridges or spans are used to provide the necessary support for the conveyor.

Conveyor support spans are typically large relative to the transportation means used to transport the spans from the factory to the customer site. Accordingly, the support spans are often shipped in piece parts that are assembled at the customer site.

On-site assembly of traditional conveyor support spans involves time consuming and potentially hazardous assembly operations, such as cutting and welding. The on-site assembly operations are typically performed in less than ideal safety circumstances and often outdoors.

Increasing the amount of conveyor span construction performed at the factory results in more controlled and generally safer span construction. However, transporting large sections of conveyor support span is economically inefficient and often results in the need for additional heavy material handling equipment at the customer site.

A need therefore exists for a modular conveyor support structure that is easy to assemble on-site and constructed from efficiently transportable components.

An object of the present modular conveyor support structure is to provide a conveyor truss module usable for constructing a conveyor truss span.

Another object of the present present modular conveyor support structure is to provide a conveyor truss module that is easy to assemble on site.

A further object of the present modular conveyor support structure is to provide a conveyor truss module made from efficiently transportable components.

SUMMARY OF THE INVENTION

One or more of the foregoing objects is met in whole or in part by an embodiment of the present modular conveyor support structure is that provides a conveyor truss module for use in constructing conveyor support spans. The conveyor truss module comprises a substantially rectangular base assembly. The base assembly comprises front and back chords coupled with left and right cross ties. The front and back chords comprise clevis attachment members for attaching the base assembly to base assemblies of adjacent conveyor truss modules.

The conveyor truss module further comprises a single-pin top chord joint for coupling top chords between adjacent conveyor truss modules. The single-pin top chord joint comprises a single top chord pin and a top chord spacer.

The preferred conveyor truss module further comprises a plurality of front and back lacing struts. The lacing struts extend from the corners of the base assembly to the single-pin top chord joint. The lacing struts each comprise a gusset and eye bar on the upper end. Each eye bar comprises an eye to receive the single top chord pin. The top chord spacer of the single-pin top chord joint separates the eye bars of the front lacing struts and the eye bars of the back lacing struts. The top chord spacer provides space between the front lacing strut eye bars and the back lacing strut eye bars for top chords coupled to the single-pin top chord joint and adjacent conveyor truss modules.

DETAILED DESCRIPTION OF PREFERRED EMBODIMENT (S)

In the following detailed description, spatially orienting terms are used, such as "upper," "lower," "left," "right," "vertical," "horizontal," and the like. It is to be understood that these terms are used for convenience of description of the preferred embodiments by reference to the drawings. These terms do not necessarily describe the absolute location in space, such as left, right, upward, downward, etc., that any part must assume.

Figure 1:
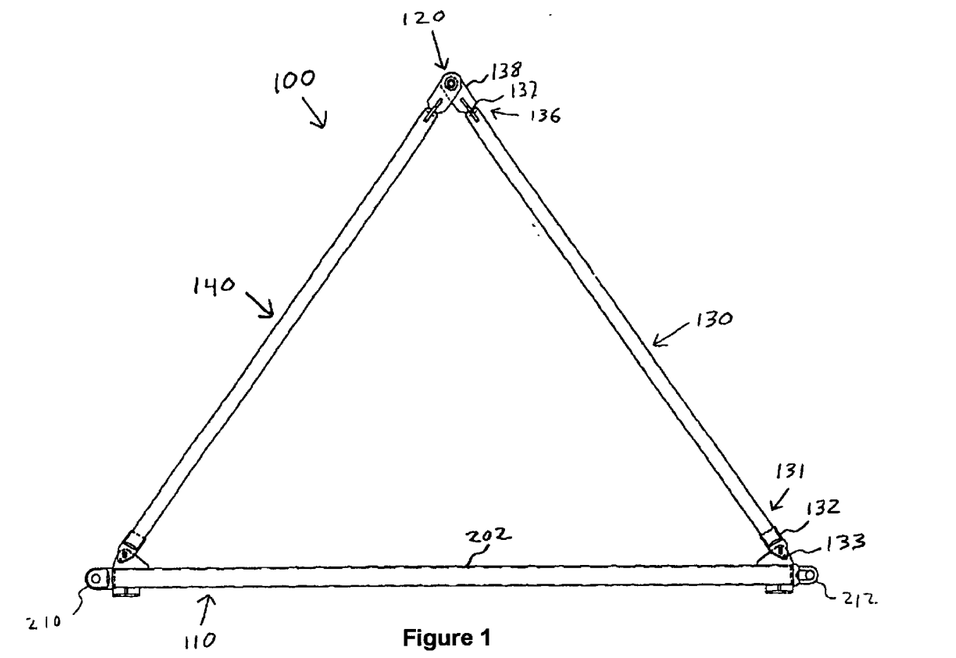
FIG. 1 illustrates one embodiment of a conveyor truss module of the present modular conveyor support structure.
Figure 2:
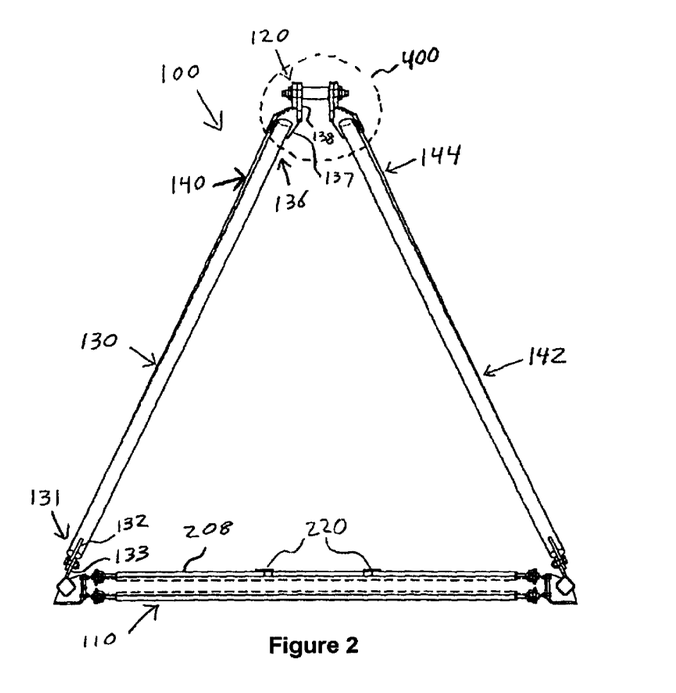
FIG. 2 is a side view of the conveyor truss module illustrated in FIG. 1.

Referring now to FIGS. 1 and 2, FIG. 1 illustrates a conveyor truss module 100 according to an embodiment of the present invention, and FIG. 2 shows a side view of the conveyor truss module 100 illustrated in FIG. 1. The conveyor truss module 100 comprises a base assembly 110 and a single-pin top chord joint 120.

A right front lacing strut 130 is coupled to the base assembly 110 and the single-pin top chord joint 120. The lower end 131 of the right front lacing strut 130 comprises a base assembly attachment plate 132. The base assembly 110 comprises a right front lacing strut attachment plate 133. The base assembly attachment plate 132 of the right front lacing strut 130 is coupled (preferably bolted) to the right front lacing strut attachment plate 133 of the base assembly 110. The upper end 136 of the right front lacing strut 130 comprises a gusset plate 137 and an eye bar 138 that is coupled to the single-pin top chord joint 120.

The conveyor truss module 100 also comprises a left front lacing strut 140, a right back lacing strut 142, and a left back lacing strut 144. Each of the lacing struts 130, 140, 142, 144 are similarly coupled to the base assembly 110 and the single-pin top chord joint 120.

Figure 3:
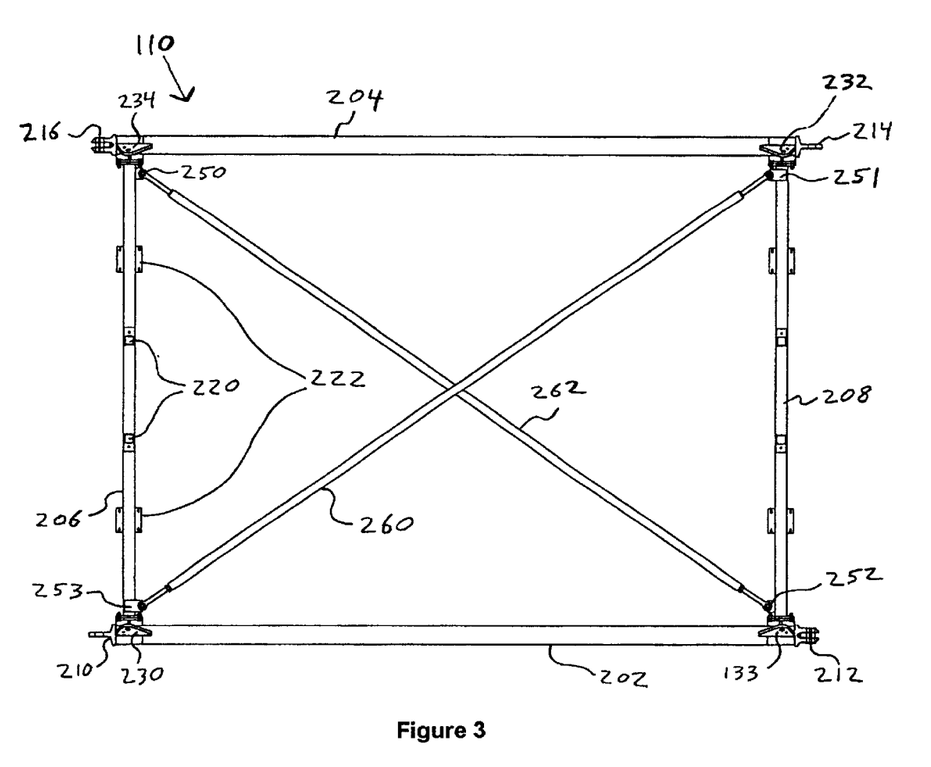
FIG. 3 shows a top view of the conveyor truss module base assembly shown in FIG. 1.

Referring now to FIG. 3, that figure shows a top view of the conveyor truss module 100 base assembly 110. The base assembly 110 comprises a front chord 202 and a back chord 204. A left cross tie 206 is coupled (preferably bolted) to the left ends of the front chord 202 and the back chord 204. Similarly, a right cross tie 208 is coupled to the right ends of the front chord 202 and the back chord 204. The front chord 202 and the back chord 204 may, for example, be approximately 20 feet long. The left cross tie 206 and the right cross tie 208 may, for example, be approximately 14 feet long.

The front chord 202 and the back chord 204 comprise base assembly attachment members 210, 212, 214, 216 (preferably clevis attachment members). For example, the front chord 202 may comprise a male clevis attachment member 210 on the left end of the front chord 202 and a female clevis attachment member 212 on the right end of the front chord 202. Similarly, the back chord 204 may comprise a male clevis attachment member 214 on the right end of the back chord 204 and a female clevis attachment member 216 on the left end of the back chord 204. The base assembly attachment members 210, 212, 214, 216 couple to corresponding base assembly attachment members on adjacent conveyor truss module base assemblies.

The front chord 202 and the back chord 204 comprise lacing strut attachment plates 133, 230, 232, 234 for the right front lacing strut 130, left front lacing strut 140, right back lacing strut 142, and left back lacing strut 144, respectively. The left cross tie 206 and the right cross tie 208 may include additional attachment members, such as conveyor attachment members (two of which are denoted by label 220) and lower rail attachment members (two of which are denoted by label 222).

The left cross tie 206 and the right cross tie 208 preferably include diagonal tie attachment members 250, 251, 252, 253. A first diagonal tie 260 is coupled (preferably bolted) to the left front diagonal tie attachment member 253 and the right back diagonal tie attachment member 251. A second diagonal tie 262 is coupled (preferably bolted) to the right front diagonal tie attachment member 252 and the left back diagonal tie attachment member 250. The first diagonal tie 260 and the second diagonal tie 262 are preferably adjustable in length.

Figure 4:
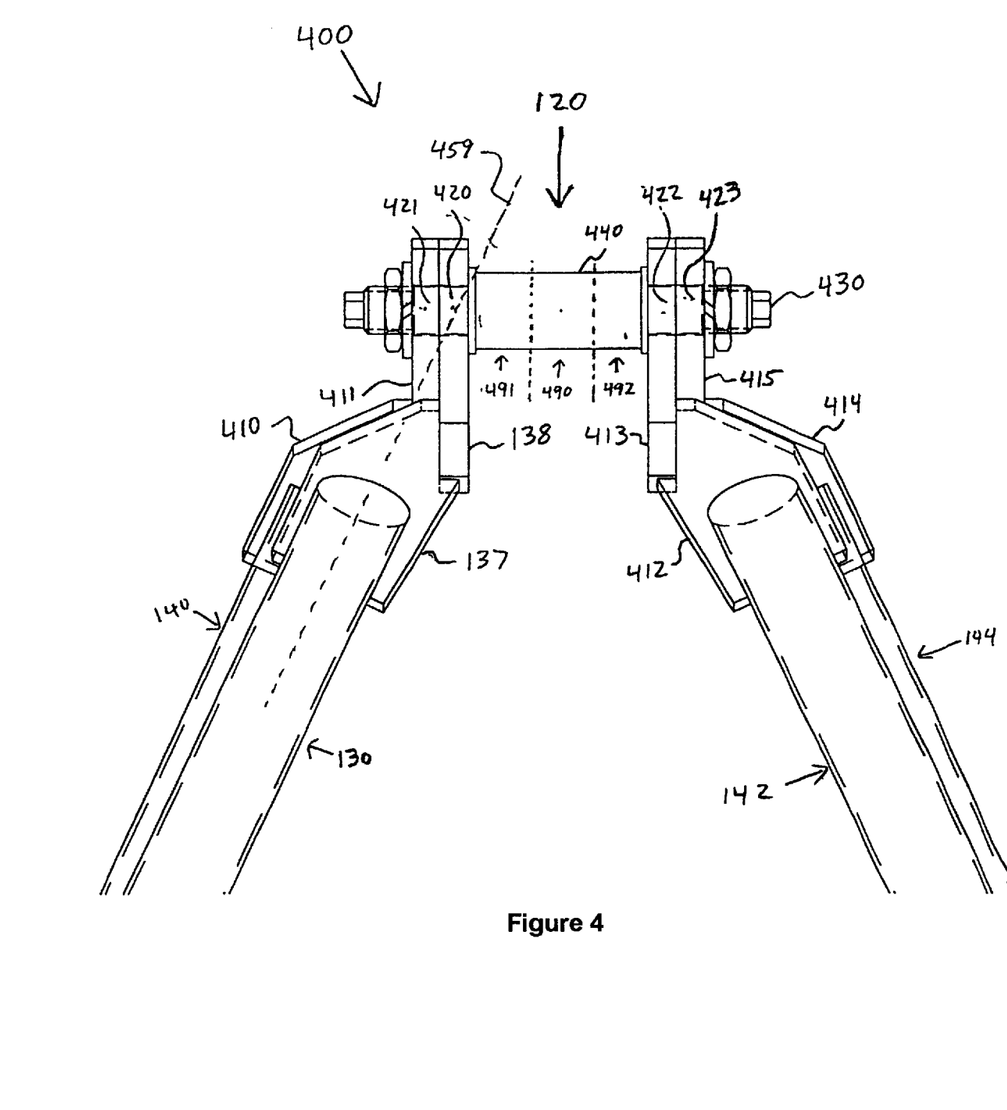
FIG. 4 illustrates a single-pin top chord joint.

Referring now to FIG. 4, that figure contains a magnified view of the single-pin top chord joint area 400 shown in FIG. 2. The right front lacing strut 130 comprises a gusset plate 137 and an eye bar 138. The left front lacing strut 140 comprises a gusset plate 410 and an eye bar 411. The right back lacing strut 142 comprises a gusset plate 412 and eye bar 413. The left back lacing strut 144 comprises a gusset plate 414 and eye bar 415. Each of the eye bars 138, 411, 413, 415 include a pin eye (420, 421, 422 and 423 respectively) to receive the top chord pin 430. Each pin eye is preferably located along the longitudinal axis of the corresponding lacing strut. For example, the pin eye 420 for the right front lacing strut 130 is preferably located along the longitudinal axis 459 of the right front lacing strut 130.

The single-pin top chord joint 120 is preferably centered over the base assembly (110 in FIGS. 1–3). Thus, the lacing struts 130, 142 corresponding to the inner eye bars 420, 422 may be slightly longer than the lacing struts 140, 144 corresponding to the outer eye bars 421, 423.

A top chord spacer 440 is disposed about the top chord pin 430 between the eye bars 138, 411 for the front lacing struts 130, 140 and the eye bars 413, 415 for the back lacing struts 142, 144. The top chord spacer 440 is adapted to receive attachment members of top chords coupled to adjacent conveyor truss modules. The top chord spacer 440 provides space between the front eye bars 138, 411 and back eye bars 413, 415 for the top chord attachment members.

Figure 5:
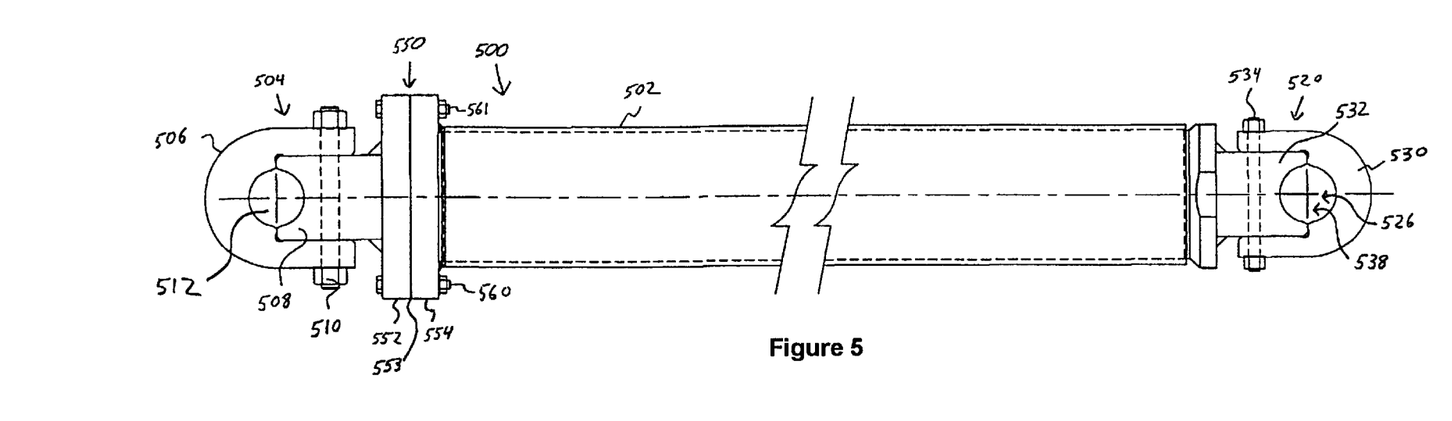
FIG. 5 illustrates a top chord.
Figure 6:
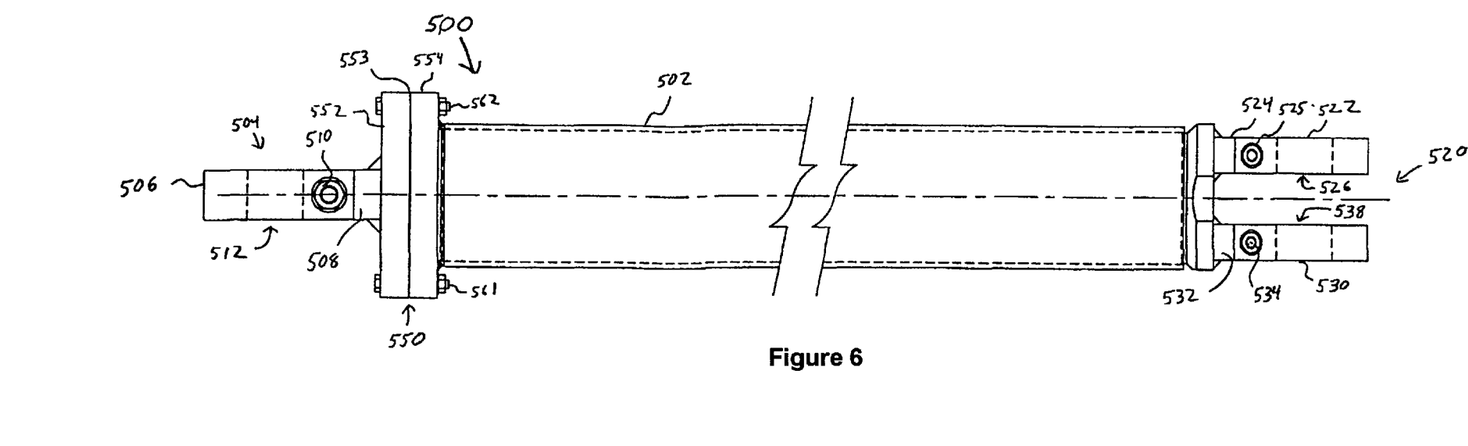
FIG. 6 shows a top view of the top chord illustrated in FIG. 5.

Referring now to FIGS. 5 and 6, FIG. 5 illustrates a top chord 500, and FIG. 6 shows a top view of the top chord 500 illustrated in FIG. 5. The top chord 500 comprises a top chord bar 502.

The left end of the top chord 500 comprises a male clevis attachment member 504 (or single eye end). The male clevis attachment member 504 may comprise an eye-bar end, including a U-shaped member 506 and an eye seat 508. A bolt assembly 510 couples the U-shaped member 506 to the eye seat 508, thereby forming a single eye 512. When the male clevis attachment member 504 is coupled to the single-pin top chord joint 120 (shown in FIG. 4), the top chord spacer 440 of the single-pin top chord joint 120 is disposed within the single eye 512.

The top chord 500 also comprises a female clevis attachment member 520 (or double-eye end). The female clevis attachment member 520 may comprise eye-bar ends including a first U-shaped member 522 and a first eye seat 524. A first bolt assembly 525 couples the first U-shaped member 522 to the first eye seat 524, thereby forming a first eye 526. The female clevis attachment member 520 also comprises a second U-shaped member 530 and a second eye seat 532. A second bolt assembly 534 couples the second U-shaped member 530 to the second eye seat 532, thereby forming a second eye 538. When the female clevis attachment member 520 is coupled to the single-pin top chord joint 120 (shown in FIG. 4), the top chord spacer 440 of the single-pin top chord joint 120 is disposed within the first eye 526 and second eye 538 of the female clevis attachment member 520.

A single-pin top chord joint, such as that denoted by label 120 in FIG. 4, is typically coupled to a male clevis attachment member from a top chord coupled to a first adjacent conveyor truss module, and a female clevis attachment member from a top chord coupled to a second adjacent conveyor truss module. Referring back to FIG. 4, a male clevis attachment member from a top chord coupled to a first adjacent conveyor truss module will typically occupy the center longitudinal space 490 along the top chord spacer 440. A female attachment member from a top chord coupled to a second adjacent conveyor truss module will typically occupy the outer longitudinal spaces 491, 492 along the top chord spacer 440.

Referring to FIGS. 5 and 6, the top chord 500 also comprises a shim assembly 550 for adjusting the longitudinal length of the top chord 500. The shim assembly 550 comprises a first shim plate 552 and a second shim plate 554. One or more shims 553 may be disposed between the first shim plate 552 and the second shim plate 554, thereby adjusting the longitudinal length of the top chord 500. Shim bolt assemblies, three of which are denoted by labels 560–562, couple the first shim plate 552, the shim(s) 553 (if any), and the second shim plate 554.

Constructing a conveyor support span using adjustable length top chords provides span shaping flexibility. For example, when constructing a span for supporting a relatively heavy load, top chords may be lengthened to pre-bow the span, thus compensating for the anticipated bowing effects of the load.

Figure 7:
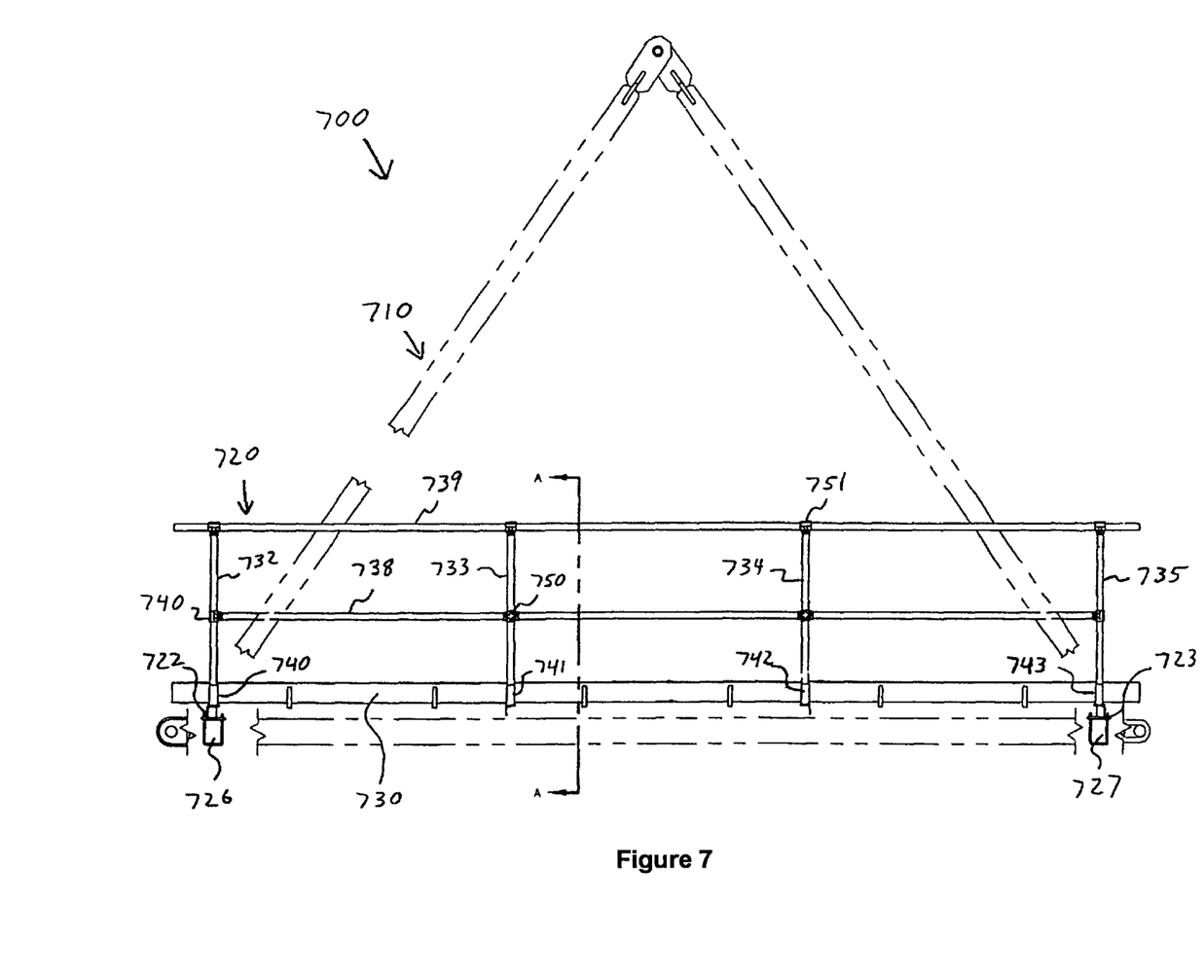
FIG. 7 illustrates a conveyor truss module with a walkway according to an embodiment of the present invention.
Figure 8:
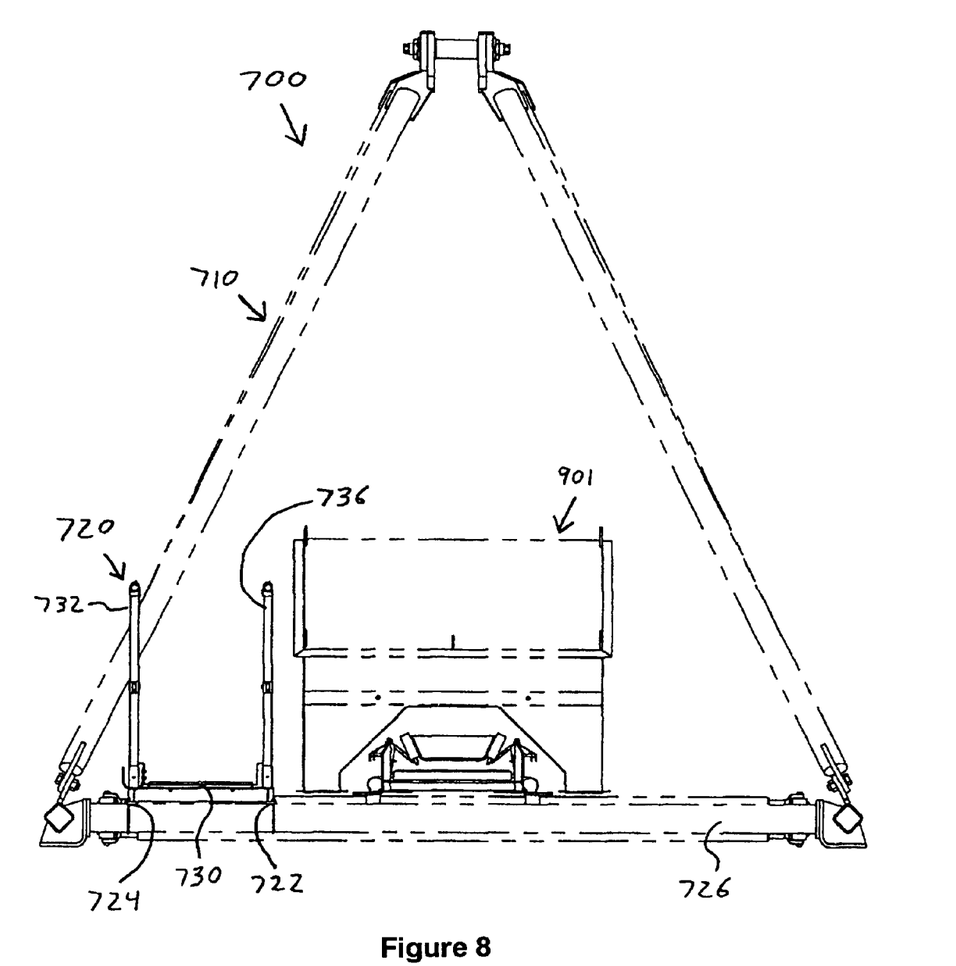
FIG. 8 shows a side view of the conveyor truss module illustrated in FIG. 7.

Referring now to FIGS. 7 and 8, FIG. 7 illustrates a conveyor truss module 700 including a modular walkway assembly 720, and FIG. 8 shows a side view of the conveyor truss module 700 illustrated in FIG. 7 along line A—A. The conveyor truss module 700 comprises a modular walkway assembly 720 coupled to a base module 710. The base module 710 is substantially similar to the conveyor truss module 100 illustrated in FIGS. 1—3.

The modular walkway assembly 720 comprises cross tie attachment members (three of which are denoted by labels 722–724) that are used to couple the walkway assembly 720 to the cross ties 726, 727 of the base module 710.

The modular walkway assembly 720 also comprises a base platform 730, vertical rails (five of which are denoted by labels 732–736), and horizontal rails (two of which are denoted by labels 738 and 739). Vertical rail attachment members 740–743 couple the vertical rails 732-735 to the base platform 730. Horizontal rail attachment members (two of which are denoted by labels 750 and 751) couple the horizontal rails 738, 739 to the vertical rails 732–735.

Figure 9:
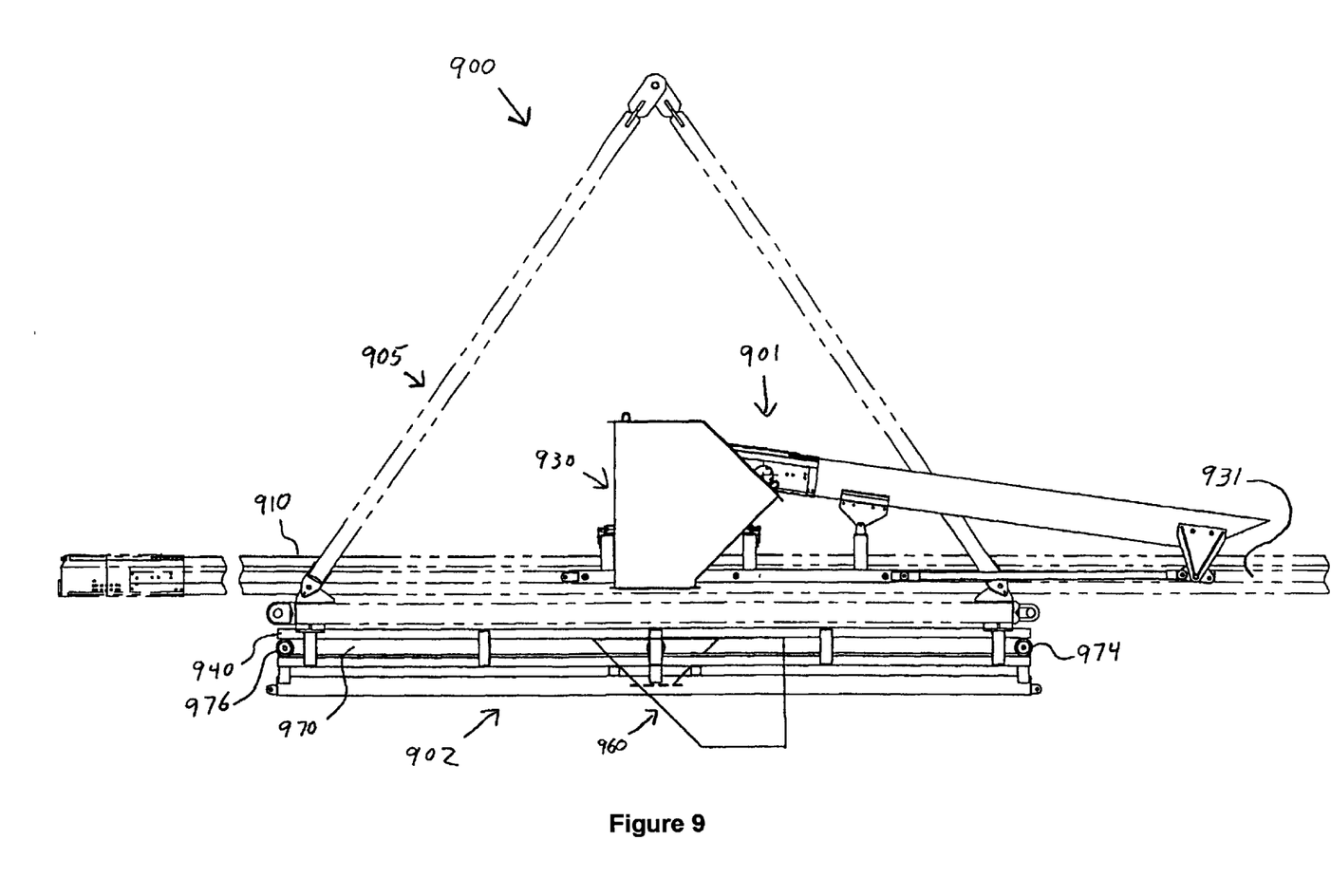
FIG. 9 illustrates a conveyor truss module with modular conveyor apparatus according to an embodiment of the present invention
Figure 10:
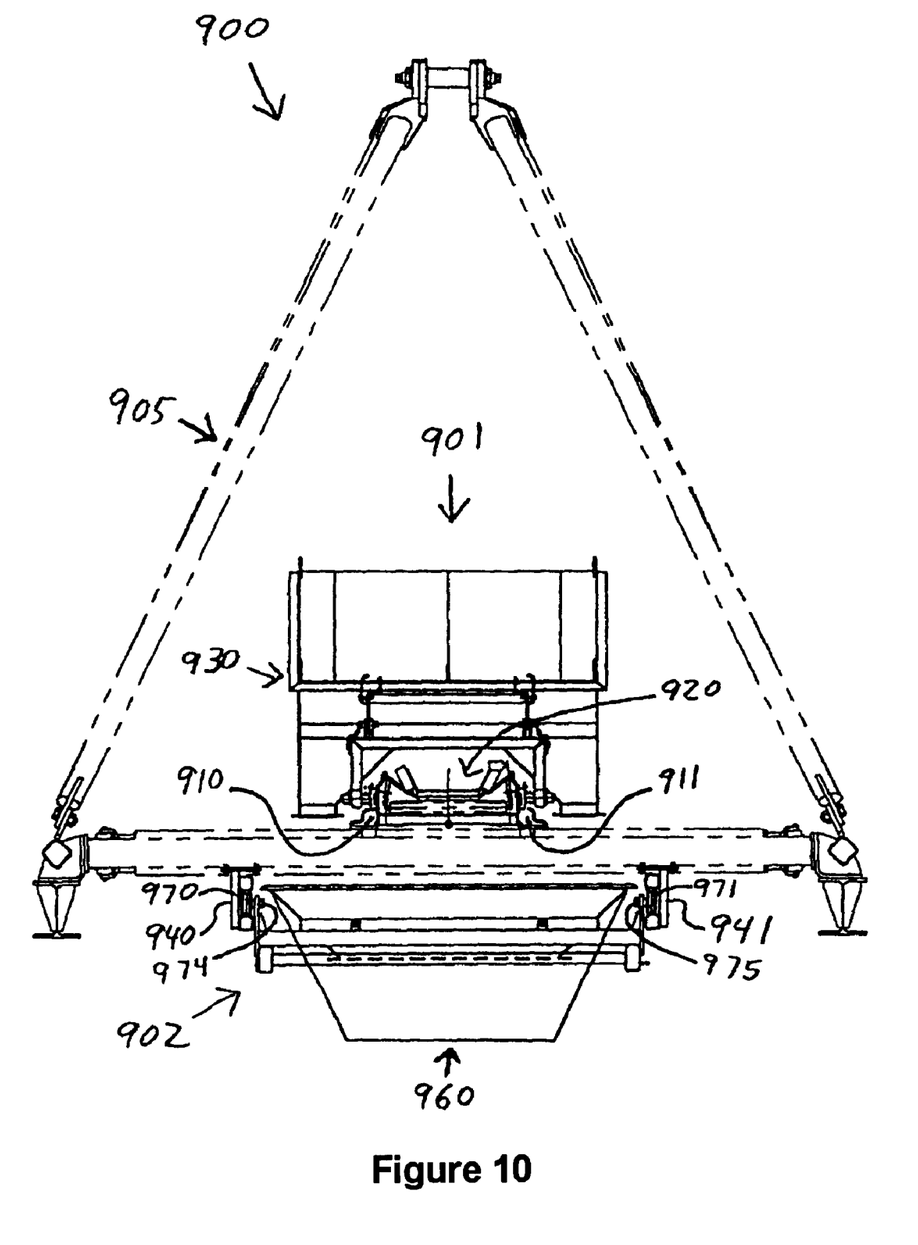
FIG. 10 shows a side view of the conveyor truss module illustrated in FIG. 9.

Referring now to FIGS. 9 and 10, FIG. 9 illustrates a conveyor truss module 900 including modular conveyor apparatus 901, 902, and FIG. 10 shows a side view of the conveyor truss module 900 illustrated in FIG. 9. The modular conveyor apparatus 901, 902 may, for example, be similar to that disclosed in U.S. patent application Ser. No. 09/464,942, filed concurrently with the present application and which is incorporated herein by reference in its entirety.

The conveyor truss module 900 comprises upper modular conveyor apparatus 901 coupled to the base module 905. The base module 905 is substantially similar to the conveyor truss module 100 illustrated in FIGS. 1–3.

The upper modular conveyor apparatus 901 comprises conveyor rails 910, 911, which may be coupled to the base module 905 using conveyor attachment members (such as the conveyor attachment members 220 illustrated in FIG. 3). The upper modular conveyor apparatus 901 may also comprise material conveying apparatus coupled to the conveyor rails 910, 911. The upper modular conveyor apparatus 901 may further comprise upper material discharge apparatus 930. The upper material discharge apparatus 930 may, for example, be translationally coupled to the conveyor rails 910, 911 using longitudinal slots (one of which is denoted by label 931) in the conveyor rails 910, 911.

The conveyor truss module 900 may comprise lower modular conveyor apparatus 902. The lower modular conveyor apparatus 902 comprises lower rails 940, 941, which may be coupled to the base module 905 using lower rail attachment members (such as the lower rail attachment members 222 illustrated in FIG. 3). The lower modular conveyor apparatus 902 may comprise lower material discharge apparatus 960 translationally coupled to the lower rails 940, 941 using longitudinal grooves 970, 971 and wheels 974–976.

Figure 11:
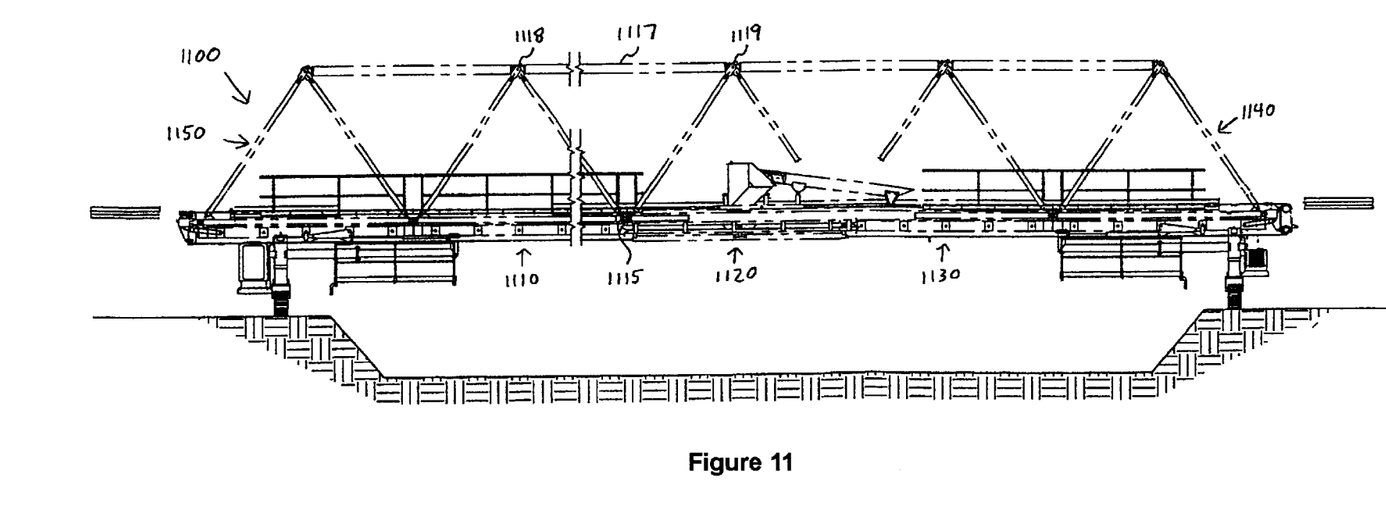
FIG. 11 illustrates a conveyor-supporting truss span according to an embodiment of the present invention.

Referring now to FIG. 11, that figure illustrates a conveyor-supporting truss span 1100 according to an embodiment of the present invention. The truss span 1100 comprises a first conveyor truss module 1110 with a modular walkway (such as the conveyor truss module 700 illustrated in FIG. 7). The truss span 1100 further comprises a second conveyor truss module 1120 with modular conveyor apparatus (such as the conveyor truss module 900 illustrated in FIG. 9).

The first conveyor truss module 1110 and the second conveyor truss module 1120 are coupled using their respective base assembly attachment members 1115 (such as the clevis attachment members 210, 212, 214, 216 shown in FIG. 3). A first top chord 1117 (such as the top chord 500 as illustrated in FIG. 5) is coupled to the single-pin top chord joint 1118 of the first truss module 1110 and the single-pin top chord joint 1119 of the second truss module 1120.

The truss span 1100 further comprises a third conveyor truss module 1130, fourth conveyor truss module 1140, and fifth conveyor truss module 1150. Each of these additional conveyor truss modules 1130, 1140, 1150 are coupled to their respective adjacent conveyor truss modules in a manner like that discussed above with respect to the first conveyor truss module 1110 and the second conveyor truss module 1120.

The present invention provides a modular conveyor support structure. The modularity of the conveyor support structure results in a conveyor support structure that is easy to assemble on-site and constructed from efficiently transportable components. The ease of assembly results in cheaper and safer on-site conveyor support construction. The increased transportability results in greatly reduced transportation cost.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings.

What is claimed is:

1. A conveyor truss module comprising:
   (a) a base assembly, said base assembly being substantially rectangular and having a left front corner, a right front corner, a left back corner, and a right back corner;
   (b) a single-pin top chord joint; and
   (c) a left front lacing strut coupled to the left front corner and said single-pin top chord joint;
   (d) right front lacing strut coupled to the right front corner and said single-pin top chord joint;
   (e) a left back lacing strut coupled to the left back corner and said single-pin top chord joint; and
   (f) a right back lacing strut coupled to the right back corner and said single-pin top chord joint.

2. The conveyor truss module of claim 1, wherein said base assembly comprises:
   a front chord having a left front chord end and a right front chord end;
   a back chord having a left back chord end and a right back chord end;
   a left cross tie coupled to the left front chord end and the left back chord end; and
   a right cross tie coupled to the right front chord end and the right back chord end.

3. The conveyor truss module of claim 2, wherein said base assembly further comprises:
   a first diagonal tie coupled to the left front chord end and the right back chord end; and
   a second diagonal tie coupled to the right front chord end and the left back chord end.

4. The conveyor truss module of claim 3, wherein said first diagonal tie and said second diagonal tie are adjustable in length.

5. The conveyor truss module of claim 2, wherein said front chord and said back chord each comprise:
   a female clevis attachment member on one end; and a male clevis attachment member on the other end.

6. The conveyor truss module of claim 2, wherein said front chord and said back chord each comprise a lacing strut attachment plate near both ends.

7. The conveyor truss module of claim 1, wherein said base assembly further comprises base assembly attachment members for coupling said base assembly to base assemblies of adjacent conveyor truss modules.

8. The conveyor truss module of claim 1, wherein said base assembly further comprises:
   a left male clevis attachment member near one of the left corners;
   a left female clevis attachment member near the other of the left corners;
   a right male clevis attachment member near one of the right corners; and
   a right female clevis attachment member near the other of the right corners.

9. The conveyor truss module of claim 1, wherein said single-pin top chord joint comprises a top chord pin extending through the upper ends of said lacing struts.

10. The conveyor truss module of claim 9, wherein said single-pin top cord joint further comprises a top chord spacer, said top chord pin extending longitudinally through said top chord spacer, said top chord spacer disposed between the upper ends of said front lacing struts and the upper ends of said back lacing struts.

11. The conveyor truss module of claim 10, wherein said top chord spacer is adapted to receive attachment members of top chords coupled to adjacent conveyor truss modules.

12. The conveyor truss module of claim 1, wherein said single-pin top chord joint comprises a top chord pin, and each of said lacing struts comprises:
   a gusset plate near the upper end of said lacing strut; and
   an eye bar attached to said gusset plate, said eye bar comprising a pin eye, said top chord pin extending through said pin eye.

13. The conveyor truss module of claim 12, wherein each of said lacing struts further comprises a base assembly attachment plate near the lower end of said lacing strut, said base assembly attachment plate for coupling said lacing strut to said base assembly.

14. The conveyor truss module of claim 5, wherein said single-pin top chord joint comprises:
   a top chord pin extending through the upper ends of said lacing struts; and
   a top chord spacer, said top chord pin extending longitudinally through said top chord spacer, said top chord spacer disposed between the upper ends of said front lacing struts and the upper ends of said back lacing struts;
and wherein each of said lacing struts comprises:
   a gusset plate near the upper end of said lacing strut;
   an eye bar attached to said gusset plate, said eye bar comprising a pin eye for receiving said top chord pin; and
   a base assembly attachment plate near the lower end of said lacing strut for attaching said lacing strut to said base assembly.

15. The conveyor truss module of claim 1, further comprising modular conveyor apparatus coupled to said base assembly.

16. The conveyor truss module of claim 1, further comprising a modular walkway coupled to said base assembly.

17. The conveyor truss module of claim 1, further comprising modular conveyor apparatus coupled to said base assembly.

18. The conveyor truss module of claim 17, wherein said modular conveyor apparatus comprises material discharge apparatus.

19. A conveyor-supporting truss span comprising:
   a first conveyor truss module as set forth in claim 7;
   a second conveyor truss module as set forth in claim 7, said base assembly attachment members on the right side of said first conveyor truss module coupled to said base assembly attachment members on the left side of said second conveyor truss module; and
   a first top chord coupled to said single-pin top chord joint of said first conveyor truss module and coupled to said single-pin top chord joint of said second conveyor truss module.

20. The conveyor-supporting truss span of claim 19, wherein said first top chord comprises:
   a male clevis attachment member on a first end of said first top chord; and
   a female clevis attachment member on a second end of said first top chord.

21. The conveyor-supporting truss span of claim 20, wherein said male and female clevis attachment members comprise eye-bar ends.

22. The conveyor-supporting truss span of claim 19, wherein said first top chord is adjustable in length.

23. The conveyor-supporting truss span of claim 19, wherein said first top chord comprises a shim assembly for adjusting the length of said first top chord.

24. The conveyor-supporting truss span of claim 22, wherein the length of said first top chord is adjusted to bow the conveyor-supporting truss span.

25. The conveyor-supporting truss span of claim 19, further comprising:
   a third conveyor truss module as set forth in claim 7, said base assembly attachment members on the left side of said third conveyor truss module coupled to said base assembly attachment members on the right side of said second conveyor truss module; and
   a second top chord coupled to said single-pin top chord joint of said second conveyor truss module and said single-pin top chord joint of said third conveyor truss module.

26. The conveyor-supporting truss span of claim 25, wherein said first top chord comprises a male clevis attachment member coupled to said single-pin top chord joint of said second conveyor truss module, and wherein said second top chord comprises a female clevis attachment member coupled to said single-pin top chord joint of said second conveyor truss module.

* * * * *